United States Patent Office 3,120,553
Patented Feb. 4, 1964

3,120,553
HALOPHENYL CARBONATE DERIVATIVES
Raymond E. Stenseth, Webster Groves, and Joseph W. Baker, Kirkwood, Mo., assignors to Monsanto Chemical Company, St. Louis, Mo., a corporation of Delaware
No Drawing. Filed May 18, 1962, Ser. No. 195,981
11 Claims. (Cl. 260—463)

This invention relates to halophenyl carbonate derivatives. More particularly, this invention is concerned with a class of new organic compounds which are ether and thioether derivatives of halophenyl carbonates. Such carbonates have been found to possess useful and unexpected biological activity.

The novel compounds of this invention have the general formula

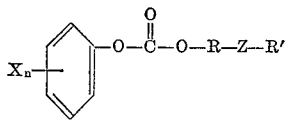

where X is selected from a group consisting of chlorine and bromine, n is an integer from 2 to 5, R is alkylene containing from 2 to 4 carbon atoms, Z is selected from a group consisting of oxygen and sulfur, and R' is selected from a group consisting of hydrogen, phenyl, halophenyl and alkyl containing from 1 to 4 carbon atoms.

As illustrative of —R—Z—R', but not limitative thereof, are 2-hydroxyethyl, 2-mercaptoethyl, 2-methoxyethyl,
2-methylthioethyl, 2-ethoxyethyl, 2-ethylthioethyl,
2-propoxyethyl, 2-propylthioethyl, 2-butoxyethyl,
2-butylthioethyl, 3-hydroxypropyl, 3-mercaptopropyl,
3-methoxypropyl, 3-methylthiopropyl, 3-ethoxypropyl,
3-ethylthiopropyl, 3-propoxypropyl, 3-propylthiopropyl,
3-butoxypropyl, 3-butylthiopropyl, 4-hydroxybutyl,
4-methoxybutyl, 4-mercaptobutyl, 4-methylthiobutyl,
4-ethoxybutyl, 4-ethylthiobutyl, 4-propoxybutyl,
4-propylthiobutyl, 4-butoxybutyl, 4-butylthiobutyl,
2-phenoxyethyl, 2-phenylthioethyl, 3-phenoxypropyl,
3-phenylthiopropyl, 2-phenoxypropyl, 2-phenylthiopropyl,
3-phenoxybutyl, 3-phenylthiobutyl, 4-phenoxybutyl,
4-phenylthiobutyl, 2-(p-chlorophenoxy)ethyl,
2-(m-bromophenylthio)ethyl, 3-(2,4-dichlorophenoxy) propyl,
2-(o-bromophenoxy)propyl, 3-(2,5-dibromophenylthio) propyl,
4-(p-chlorophenoxy)butyl, 3-(3,4-dichlorophenylthio) butyl,
2-(2-4,5-trichlorophenoxy)ethyl,
3-(2,3,4,6-tetrachlorophenoxy)propyl,
3-pentachlorophenoxypropyl, and the various isomers thereof.

This class of compounds can be prepared by causing a selected halophenyl chloroformate to react with a selected alcohol to yield a desired ether or thioether derivative of a halophenyl carbonate. In such reactions, it is preferred to add a tertiary amine to the reaction mixture to serve as an acceptor for the hydrogen chloride which forms during the reaction. Examples of tertiary amines which may be used are quinaldine, triethylamine, dimethylaniline, diethylaniline, pyridine, and the like. Examples of reactions utilizing an amine acceptor yielding a desired halophenyl carbonate are as follows:

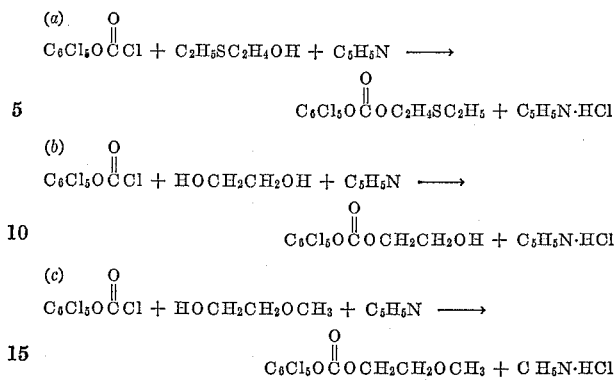

In practicing the preparations of Equations (a), (b) or (c), it is preferred to use an inert organic solvent to dissolve the reactants. Among the suitable solvents are benzene, toluene, xylene, hexane, heptane, octane, propyl ether, ethyl ether, tetrahydrofuran, dioxane, and the like. The reaction temperatures employed in preparing the new compounds will depend upon the reactants and solvents employed.

It should be noted that, although both are preferred, neither the tertiary amine nor the inert organic solvent are essential to the preparation of the compounds of this invention. In absence of such an amine, the hydrogen chloride which forms during the reaction can be boiled off. The following equation illustrates a reaction according to this invention without using an amine hydrogen chloride acceptor:

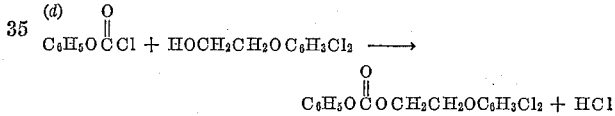

The invention will be more fully understood by reference to the following examples which are set forth herein solely for the purposes of illustration and are not to be construed as limiting the scope of the present invention.

Example I

A suitable reaction vessel is charged with 16.4 grams (0.05 mole) of pentachlorophenyl chloroformate, 5.3 grams (0.05 mole) of 2-ethylthioethanol, and 200 ml. anhydrous ether to dissolve the reactants. The resulting solution is cooled to —4° C. and stirred during the dropwise addition, over a period of about 25 minutes, of 4.0 grams (0.05 mole) of pyridine dissolved in 25 ml. ether. During the addition of the pyridine, the temperature of the reaction is maintained between —4° and —2° C. A white precipitate forms in the reaction vessel and is promptly filtered and washed with ether. The combined washings and filtrate are evaporated to remove the ether. There is obtained 15.1 grams of 2-ethylthioethyl pentachlorophenyl carbonate as an oily substance which solidifies to a white solid upon chilling and shows an M.P. of 57–59° C. using the Fisher-Johns melting point apparatus. The white solid is dissolved in Skellysolve B (an essentially n-hexane solvent having a boiling range of 60–70° C.) and recrystallized yielding white crystals having a melting point of 62–63° C. Analysis shows 44.6% chlorine as against a calculated value of 44.5% for $C_{11}H_9Cl_5O_3S$.

Example II

A suitable reaction vessel is charged with 16.4 grams (0.05 mole) of pentachlorophenyl chloroformate dissolved in 150 ml. ether. The reaction vessel contents are chilled to 5° C. To the chilled solution, 31.0 grams (0.5 mole) of ethylene glycol is added. A large excess of glycol is desired in this reaction to avoid bis-carbonate formation. The resulting mixture is stirred during the dropwise addition of 4.0 grams of pyridine, dissolved in 25 ml. ether, over a period of about 30 minutes. The mixture is allowed to come to room temperature and is stirred for four hours. It is then filtered and washed with ether. The combined washings and filtrate are evaporated to remove the ether to give an essentially quantitative yield of 14.6 grams of 2-hydroxyethyl pentachlorophenyl carbonate as a white, pasty solid having a melting point of 110–120° C. using the Fisher-Johns melting point apparatus. Recrystallization from Skellysolve B and benzene raises the melting point to 141–142° C. Analysis shows 49.8% chlorine as against a calculated value of 50.0% for $C_9H_5Cl_5O_4$.

*Example III*

A suitable reaction vessel is charged with 16.4 grams (0.05 mole) of pentachlorophenyl chloroformate, 3.8 grams (0.05 mole) of 2-methoxyethanol, and 150 ml. anhydrous ether to dissolve the reactants. The resulting solution is cooled to 0° C. and stirred during the dropwise addition, over a period of about 30 minutes, of 4.0 grams (0.05 mole) of pyridine dissolved in 25 ml. ether. The temperature of the reactants is maintained at 0° C. during the addition of the pyridine. The resulting mixture is filtered cold, and the precipitate is washed with cold ether. The ether is removed from the combined filtrate and washings to give an essentially quantitative yield of 14.0 grams of 2-methoxyethyl pentachlorophenyl carbonate as a pale yellow oil. The oil solidifies upon cooling to a white solid having a melting point of 66–70° C. with the Fisher-Johns melting point apparatus. Recrystallization from methylcyclohexane raises the melting point to 71–72° C. A second recrystallization from methylcyclohexane yields white crystals having an M.P. 73–74° C. Analysis shows 48.4% chlorine as against a calculated value of 48.1% for $C_{10}H_7Cl_5O_4$.

*Example IV*

A suitable reaction vessel is charged with 8.2 grams (0.025 mole) of pentachlorophenyl chloroformate, 5.2 grams (0.025 mole) of 2-(2,4-dichlorophenoxy)ethanol, and 50 ml. xylene. The resulting solution is stirred for 8 hours at 140° C. The solution is allowed to cool to room temperature and stand overnight. White crystals form and settle in the reaction vessel. The supernatant liquid is decanted from the crystals. The crystals are washed with cold xylene twice and dried, yielding 3.7 grams of 2-(2,4-dichlorophenoxy)ethyl pentachlorophenyl carbonate having an M.P. 157–159° C. with the Fisher-Johns melting point apparatus.

The washings are combined with the mother liquor and evaporated with a steam bath under an air jet to remove the xylene and hydrogen chloride yielding a brown, pasty solid. Recrystallization from toluene yields 4.3 grams of 2-(2,4-dichlorophenoxy)ethyl pentachlorophenyl carbonate as a while solid, M.P. 150–154° C. The white solid is combined with the above white crystals and recrystallized from toluene to yield 6.9 grams of 2-(2,4-dichlorophenoxy)ethyl pentachlorophenyl carbonate as white crystals, M.P. 155–156° C. Analysis shows 49.5% chlorine as against 49.7% calculated for $C_{15}H_7Cl_7O_4$.

*Example V*

In a suitable reaction vessel, 16.4 grams (0.05 mole) of pentachlorophenyl chloroformate is reacted with 7.2 grams (0.05 mole) of 2-pentachlorophenoxyethanol according to the procedure set forth in Example IV. There is obtained 2-pentachlorophenoxyethyl pentachlorophenyl carbonate in good yield.

*Example VI*

In a suitable reaction vessel, 16.4 grams (0.05 mole) of pentachlorophenyl chloroformate is reacted with 7.6 grams (0.05 mole) of 2-(2,4-dichlorophenylthio)ethanol according to the procedure set forth in Example I. There is obtained 2-(2,4-dichlorophenylthio)ethyl pentachlorophenyl carbonate in good yield.

*Example VII*

In a suitable reaction vessel, 16.4 grams (0.05 mole) of pentachlorophenyl chloroformate is reacted with 7.3 grams (0.05 mole) of 4-butoxybutanol according to the procedure set forth in Example III. There is obtained 4-butoxybutyl pentachlorophenyl carbonate in good yield.

*Example VIII*

In a suitable reaction vessel, 16.4 grams (0.05 mole) of pentachlorophenyl chloroformate is reacted with 6.6 grams (0.05 mole) of 4-propoxybutanol according to the procedure set forth in Example III. There is obtained 4-propoxybutyl pentachlorophenyl carbonate.

*Example IX*

In a suitable reaction vessel, 16.4 grams (0.05 mole) of pentachlorophenyl chloroformate is reacted with 7.7 grams (0.05 mole) of 4-phenoxybutanol according to the procedure set forth in Example V. There is obtained 4-phenoxybutyl pentachlorophenyl carbonate in good yield.

*Example X*

In a suitable reaction vessel, 16.4 grams (0.05 mole) of pentachlorophenyl chloroformate is reacted with 2-butylthioethanol according to the procedure set forth in Example I. There is obtained 2-butylthioethyl pentachlorophenyl carbonate in good yield.

*Example XI*

In a suitable reaction vessel, 18.4 grams (0.05 mole) of propylene glycol is reacted with 16.4 grams (0.05 mole) of pentachlorophenyl chloroformate according to the procedure set forth in Example II. There is obtained 3-hydroxypropyl pentachlorophenyl carbonate in good yield.

Following the procedures outlined in Examples I–V, other halophenyl carbonate derivatives are readily prepared. Such other representative derivatives include:

2-methylthioethyl pentabromophenyl carbonate;
3-methoxypropyl pentachlorophenyl carbonate;
3-butoxypropyl 2,3,4,6-tetrachlorophenyl carbonate;
4-ethoxybutyl 2,4-dichlorophenyl carbonate;
2-phenoxyethyl pentachlorophenyl carbonate;
2 - (2,4,5 - trichlorophenoxy)ethyl 2,4,6 - tribromophenyl carbonate;
2-propylthioethyl 2,5-dibromophenyl carbonate;

and the like.

As noted above, the products of this invention are useful as microbiocides adapted to be employed for the control of bacterial and fungal organisms. In a representative test, 2-hydroxyethyl pentachlorophenyl carbonate is active against *Staphylococcus aureus* at a dilution in excess of one part per million and against *Aspergillus niger* at a dilution in excess of one part per one hundred thousand.

While this invention has been described with respect to certain specific embodiments, it is not so limited. It is to be understood that variations and modifications thereof may be made without departing from the spirit and scope of this invention:

What is claimed is:
1. A compound of the formula

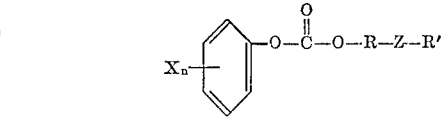

where X is selected from a group consisting of chlorine and bromine, $n$ is an integer from 2 to 5, R is alkylene containing from 2 to 4 carbon atoms, Z is selected from a group consisting of oxygen and sulfur, and R' is selected from a group consisting of hydrogen, phenyl, halophenyl and alkyl containing from 1 to 4 carbon atoms.

2. A compound of the formula

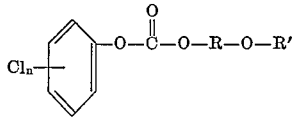

where $n$ is an integer from 2 to 5, R is alkylene containing from 2 to 4 carbon atoms, and R' is alkyl containing from 1 to 4 carbon atoms.

3. A compound of the formula

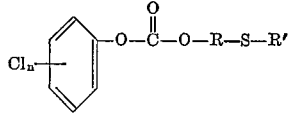

where $n$ is an integer from 2 to 5, R is alkylene containing from 2 to 4 carbon atoms, and R' is alkyl containing from 1 to 4 carbon atoms.

4. A compound of the formula

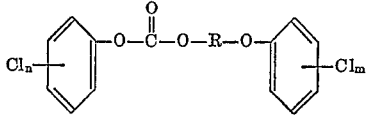

where $n$ is an integer from 2 to 5, R is alkylene containing from 2 to 4 carbon atoms, and $m$ is an integer from 0 to 5.

5. A compound of the formula

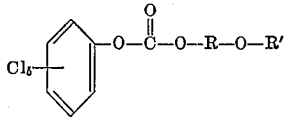

where R is ethylene and R' is alkyl containing from 1 to 4 carbon atoms.

6. A compound of the formula

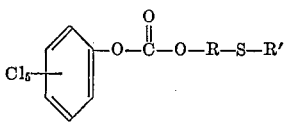

where R is ethylene and R' is alkyl containing from 1 to 4 carbon atoms.

7. 2-phenoxyethyl 2,4,5-trichlorophenyl carbonate.
8. 2-ethylthioethyl pentachlorophenyl carbonate.
9. 2 - (2,4 - dichlorophenoxy)ethyl pentachlorophenyl carbonate.
10. 2-hydroxyethyl pentachlorophenyl carbonate.
11. 2-methoxyethyl pentachlorophenyl carbonate.

References Cited in the file of this patent

UNITED STATES PATENTS 2,866,758    Newman et al. _____ Dec. 30, 1958